United States Patent
Schurig

[19]

[11] Patent Number: 6,135,569
[45] Date of Patent: Oct. 24, 2000

[54] ARRANGEMENT FOR INDEXING A CENTERPIECE OF A WHEEL TO A PREDETERMINED ORIENTATION DURING WHEEL ROTATION AND RELATED METHOD

[75] Inventor: Darren Schurig, Irvine, Calif.

[73] Assignee: Chrysler Corporation, Auburn Hills, Mich.

[21] Appl. No.: 09/167,677

[22] Filed: Oct. 7, 1998

[51] Int. Cl.[7] ........................................................ B60B 7/20
[52] U.S. Cl. ...................... 301/37.25; 301/108.5
[58] Field of Search ............... 301/37.1, 37.25, 301/37.26, 108.1, 37.38, 108.5; 40/587

[56] References Cited

U.S. PATENT DOCUMENTS

| | | | |
|---|---|---|---|
| 1,832,605 | 11/1931 | Zallio | 40/587 |
| 3,722,958 | 3/1973 | Marshall | 301/37.25 |
| 5,290,094 | 3/1994 | Gragg | 301/37.25 |
| 5,588,715 | 12/1996 | Harlen | 301/37.25 |
| 5,623,777 | 4/1997 | Hsiao et al. | 301/37.25 X |

*Primary Examiner*—Russell D. Stormer
*Attorney, Agent, or Firm*—Mark P. Calcaterra

[57] ABSTRACT

A wheel assembly for a motor vehicle includes a centerpiece assembly which indexes to a predetermined orientation during rotation of a rim. The wheel assembly includes a spindle rotatably attached to the rim which defines a spindle axis. The centerpiece assembly is attached to the spindle. A first plurality of magnets is attached to the centerpiece assembly and a second plurality of magnets is fixedly positioned behind the rim. The second plurality of magnets creates a magnetic field which aligns with a magnetic field created by the first plurality of magnets and thereby indexes the centerpiece assembly to the predetermined orientation. The centerpiece assembly is preferably inertially neutral with respect to the spindle axis.

21 Claims, 3 Drawing Sheets

ARRANGEMENT FOR INDEXING A CENTERPIECE OF A WHEEL TO A PREDETERMINED ORIENTATION DURING WHEEL ROTATION AND RELATED METHOD

BACKGROUND OF THE INVENTION

1. Technical Field

The present invention generally pertains to an arrangement for indexing an element carried by a rotatable member to a predetermined orientation and a related method. More particular, the present invention pertains to an arrangement for indexing the position of a decorative element on a wheel of a motor vehicle and a related method. More specifically, but without restriction to the particular embodiment and/or use which is shown and described for purposes of illustration, the present invention relates to an arrangement operative for creating a magnetic field which operates to index an ornamental portion of a motor vehicle wheel to a predetermined orientation during rotation of the wheel.

2. Discussion

The ornamental design of motor vehicle wheels is a crowded area of art. Known motor vehicle wheel designs typically employ a repetitive pattern which does not depend upon a particular orientation for proper viewing. In this manner, such motor vehicle wheels continually present a substantially uniform appearance independent of wheel orientation.

To a much more limited extent, motor vehicle wheel designs have been heretofore employed which incorporate a portion, such as a centerpiece, which has a preferred orientation. For example, such a wheel design is illustrated in commonly assigned U.S. Ser. No. 29/080,994, filed Dec. 22, 1997. U.S. Ser. No. 29/080,994 is hereby incorporated by reference as if fully set forth herein. As illustrated, the design disclosed in U.S. Ser. No. 29/080,994 (now U.S. Pat. No. D408,775) includes a centerpiece having a winged design. The preferred orientation for the centerpiece is shown in the figures.

While known motor vehicle wheel designs have generally proven to be acceptable for their intended purposes, they are all associated with limitations addressed by the present invention. Most particularly insofar as the present invention is concerned, known motor vehicle wheel designs are unable to suitably incorporate a decorative component which may be indexed to a predetermined orientation during wheel rotation.

SUMMARY OF THE INVENTION

It is a general object of the present invention to provide an arrangement for indexing a centerpiece of a motor vehicle wheel assembly to a predetermined orientation as the wheel assembly is rotated.

In one form, the present invention provides an arrangement in combination with a first element and a second element for orienting the second element to a predetermined position during rotation of said first element about an axis of rotation. The arrangement includes a spindle rotatably attached to the first element. The second element is attached to the spindle. The spindle defines a spindle axis. The arrangement further includes a first plurality of magnets and a second plurality of magnets. The first plurality of magnets is attached to the second element. The first plurality of magnets create a first magnetic field. The second plurality of magnets is fixedly positioned behind the first element. The second plurality of magnets create a second magnetic field.

In another form, the present invention provides a wheel assembly in combination with a motor vehicle. The wheel assembly includes a rim rotatably interconnected to the motor vehicle, a centerpiece carried by the rim, and means for indexing the centerpiece to a predetermined orientation during rotation of the rim. The means for indexing the centerpiece to a predetermined orientation during rotation of the rim preferably includes a spindle rotatably attached to the rim to which the centerpiece is attached. The spindle defines a spindle axis.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
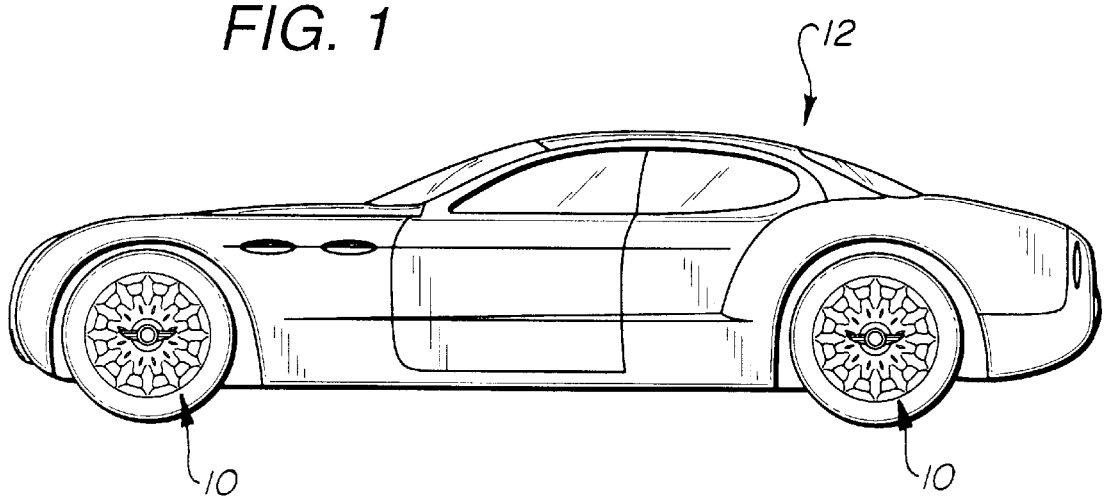
FIG. 1 is an environmental view of a motor vehicle having a pair of wheel assemblies each including an arrangement for indexing an element carried by the wheel assembly to a predetermined orientation during rotation of the wheel rim in accordance with the teachings of the preferred embodiment of the present invention.
Figure 2:
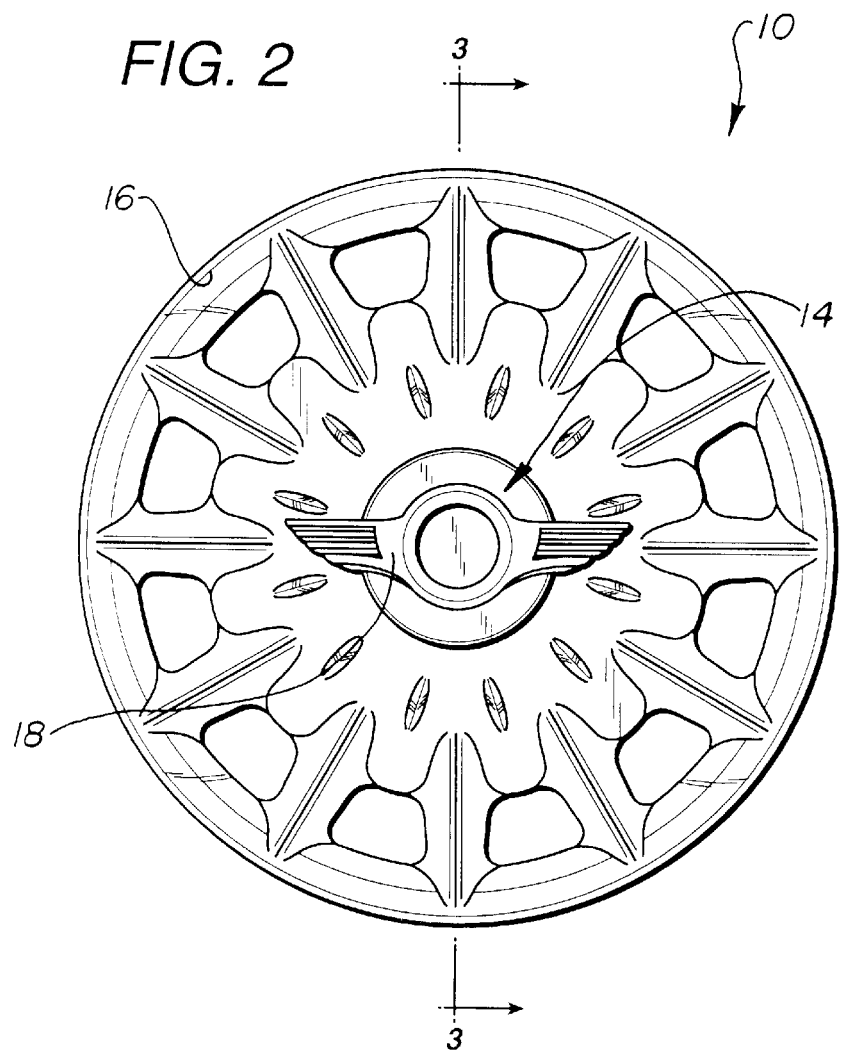
FIG. 2 is an enlarged view of one of the wheel assemblies of FIG. 1.

With initial reference to FIGS. 1 and 2, an exemplary wheel assembly 10 for a motor vehicle 12 is illustrated. In the preferred embodiment, the teachings of the present invention are incorporated into an arrangement for indexing a first element or centerpiece assembly 14 of the wheel assembly 10 to a predetermined orientation as a second element or rim 16 of the wheel assembly 10 rotates. However, it will be understood that the teachings of the present invention have broader applicability for indexing an element of an assembly having a rotatable member to a predetermined orientation.

With continued reference to FIGS. 1 and 2, the wheel assembly 10 is illustrated to include an exemplary ornamental design. In this regard, it will be readily appreciated that various other types of ornamental designs may be employed. As shown, the wheel assembly 10 incorporates a rim 16 having a repetitive pattern. Thus, the rim 16 does not require any particular orientation to establish an upright condition. The centerpiece assembly 14 of the wheel assembly 10 includes a non-repetitive design having a preferred orientation. As illustrated, the centerpiece assembly 14 includes a decorative wing-like portion 18 preferably intended to be oriented generally horizontal, as shown in FIGS. 1 and 2.

Figure 3:
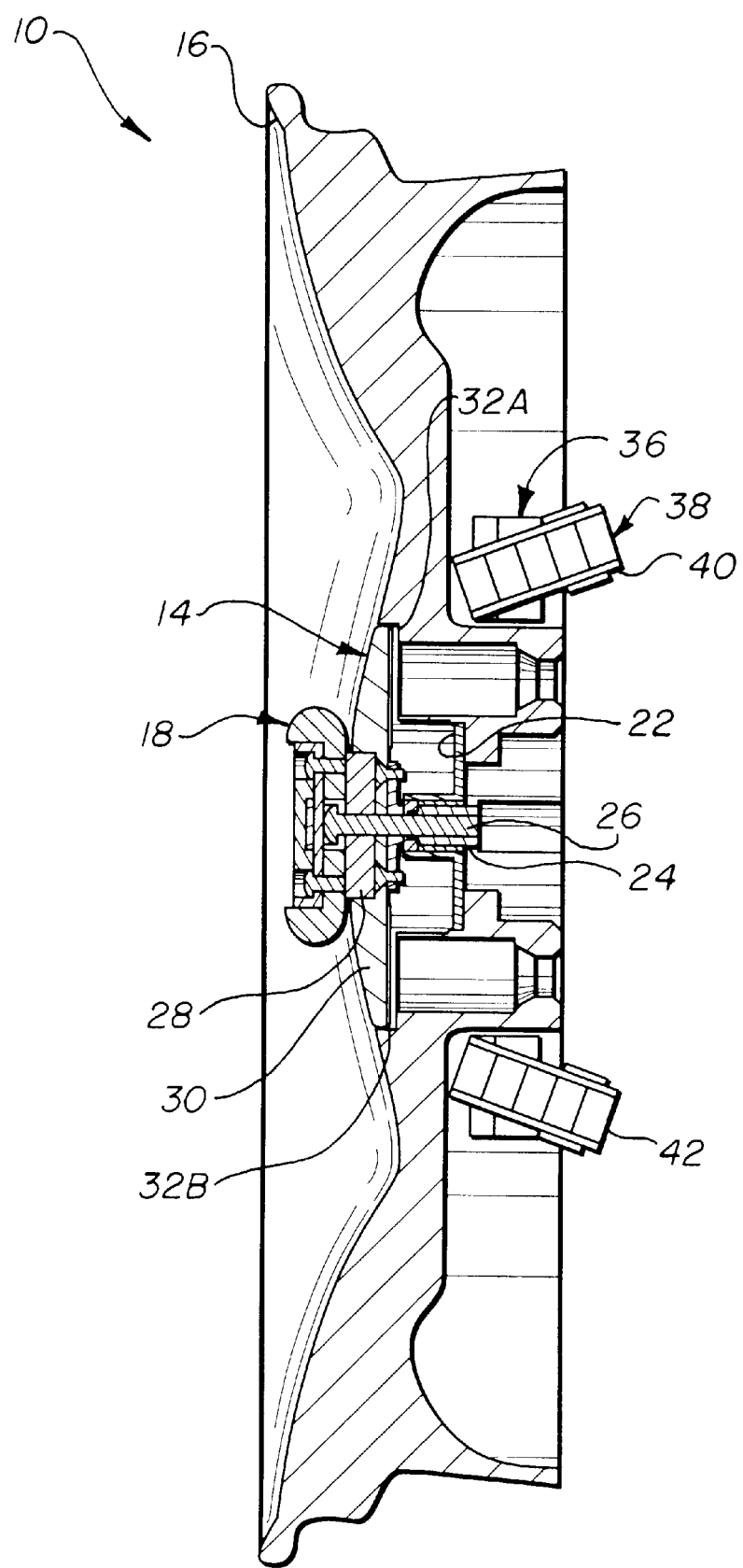
FIG. 3 is a cross-sectional view taken along the line 3—3 of FIG. 2.

With continued reference to FIGS. 1 and 2 and additional reference to FIGS. 3 and 4, the arrangement of the present invention for indexing the centerpiece assembly 14 to a predetermined orientation as the rim 16 is rotated will now be described in detail. The present invention is illustrated to include a common housing 22 in which bearings 24 are provided. The bearings 24 receive a spindle 26 which is adapted for rotation relative to the rim 16 about a substantially horizontal spindle axis. The common housing 22 may be welded, press fit, or otherwise suitably attached to the rim 16 so as to be cocentric to the rim 16. The centerpiece assembly 14 is fixedly mounted to the spindle 26 such that the centerpiece provides an appearance that it is attached firmly to the rim 16 in a standard way (e.g., screwed or snapped in place). The common housing 22 is configured with necessary clearance to allow the spindle 26 and the centerpiece assembly 14 to spin relative to the rim 16 without interference.

In the exemplary embodiment illustrated, the centerpiece assembly 14 is illustrated to include a base element or mounting member 28. An outer member 30 of the centerpiece assembly 14, which is generally toroidal in shape, is welded or otherwise suitably attached to the mounting member 28. The decorative portion 18 of the centerpiece assembly 14 is in turn bolted or otherwise suitably attached to the mounting member 28.

A first plurality of magnets are attached to a rear side of the outer member 30. In the exemplary embodiment illustrated, the first plurality of magnets include a first magnet 32A and a second magnet 32B. The magnets 32A and 32B are preferably oriented on opposite sides of the spindle axis 26 so as to create a polar magnetic orientation.

With the centerpiece assembly 14 completely assembled, including the first plurality of magnets and the spindle 26, the centerpiece assembly 14 is precisely balanced with respect to the spindle axis. Such precision balancing may require the addition of weights or the removal of material from portions of the centerpiece assembly 14. Precision balancing of the centerpiece assembly 14 is critical to the functionality of the present invention as it ensures that inertial forces, either linear or rotational, that will effect the position of the centerpiece assembly are absent. For example, accelerating or braking of the vehicle 12 would otherwise tend to disturb the position of the centerpiece assembly 14. Thus, the centerpiece assembly in full configuration must be completely inertially neutral with respect to the spindle axis.

Figure 4:
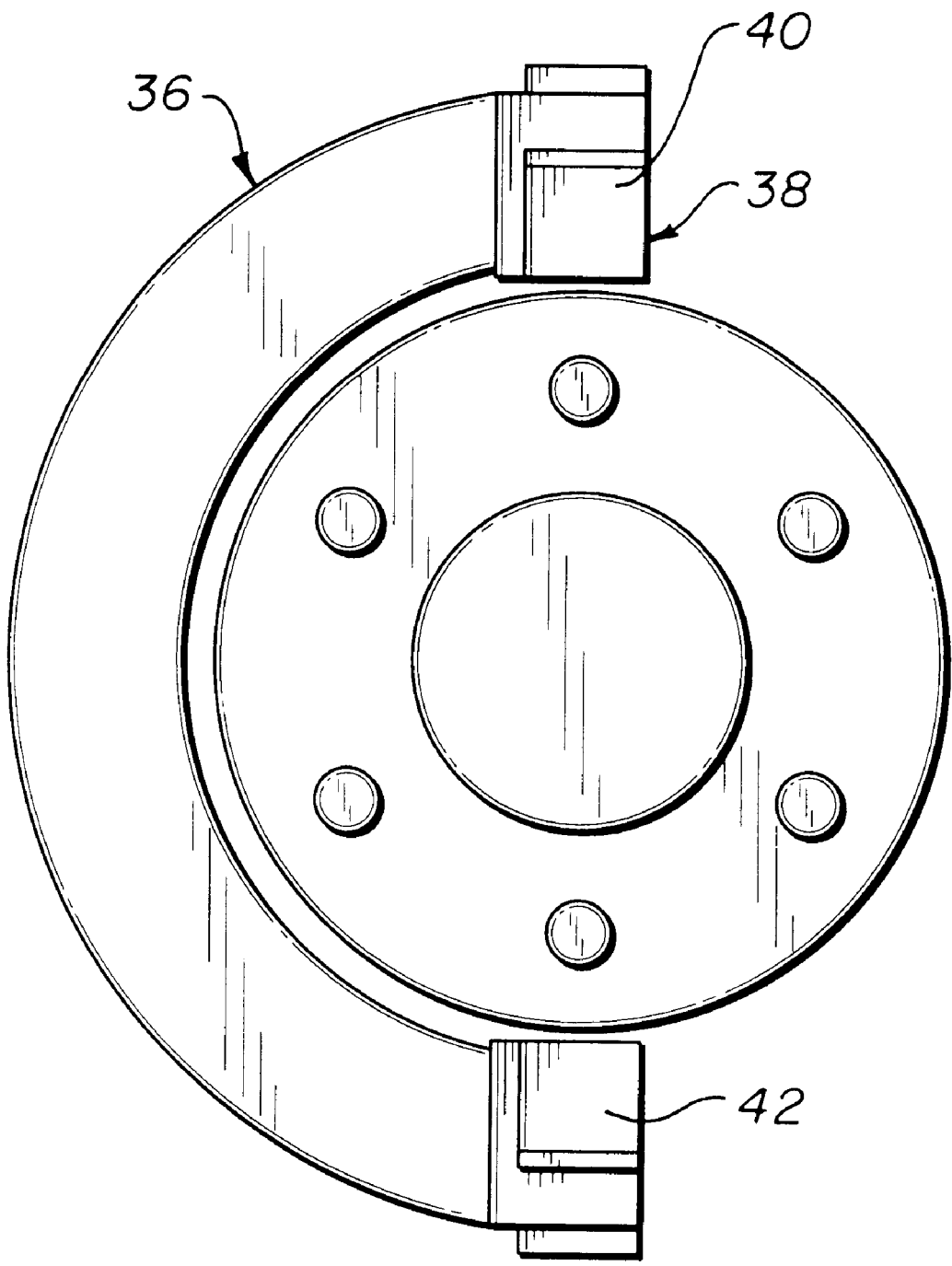
FIG. 4 is front view of a magnet mounting bracket of FIG. 3.

With particular reference to FIG. 4, the present invention is illustrated to include a mounting bracket 36 configured to mount to a non-rotatable portion of the vehicle 12 positioned adjacent the wheel assembly 10. For example, the bracket member 36 may be mounted to a brake caliper, a backing plate, an axle housing or other suitable structure. A second plurality of magnets 38 are carried by the bracket member 36 and suspended in close proximity to the back side of the rim 16. In the embodiment illustrated, the second plurality of magnets 38 include first and second magnet stacks 40 and 42 configured in diametrically opposed positions with respect to the rim 16. The magnetic fields produced by these magnets 40 and 42 are oriented and aligned to produce a linear magnetic field passing the center of the front side of the rim 16. This magnetic field acts through the material of the rim 16 and engages the magnets 32a and 32b on the back side of the outer member 30 of the centerpiece assembly 16. Alignment of the magnetic fields function to index the centerpiece assembly 14 to a predetermined orientation during rotation of the rim 16. As a result, the centerpiece assembly 14 appears to "float" in the center of the rim 16.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An arrangement in combination with a first element and a second element for indexing the second element to a predetermined orientation during rotation of the first element about an axis of rotation, the arrangement having a front side and a rear side, the arrangement comprising:

a spindle rotatably attached to the first element, the second element attached to said spindle, said spindle defining a spindle axis;

a first plurality of magnets attached to the second element, said first plurality of magnets creating a first magnetic field; and a second plurality of magnets fixedly positioned behind said first element, said second plurality of magnets creating a second magnetic field;

whereby said first and second magnetic fields cooperate to index the second element to the predetermined orientation during rotation of the first element.

2. The arrangement of claim 1, wherein said first plurality of magnets includes first and second magnets disposed in diametrically opposite positions with respect to said spindle axis.

3. The arrangement of claim 1, wherein said second plurality of magnets includes first and second magnet stacks disposed in diametrically opposite positions with respect to said spindle axis.

4. The arrangement of claim 1, wherein said spindle axis is aligned with said axis of rotation.

5. The arrangement of claim 1, wherein said second element is inertially neutral with respect to said spindle axis.

6. The arrangement of claim 1, wherein said first element comprises a wheel rim and said second element comprises a centerpiece.

7. A wheel assembly for a motor vehicle, the wheel assembly having a front side and a rear side, the wheel assembly comprising:

a rim adapted to be interconnected to the motor vehicle for rotation about an axis of rotation;

a centerpiece carried by said rim; and means for indexing said centerpiece to a predetermined orientation during rotation of said rim including:

a spindle rotatable attached to said rim, said centerpiece attached to said spindle, said spindle defining a spindle axis;

a first plurality of magnets attached to said centerpiece; and a second plurality of magnets fixedly positioned behind said rim.

8. The wheel assembly of claim 7, wherein said first plurality of magnets includes first and second magnets disposed in diametrically opposite positions with respect to said spindle axis so as to create a first magnetic field.

9. The wheel assembly of claim 7, wherein said second plurality of magnets includes first and second magnet stacks disposed in diametrically opposite positions with respect to said spindle axis so as to create a second magnetic field such that said second magnetic field cooperates with said first magnetic field to thereby index said centerpiece to a predetermined orientation during rotation of said rim.

10. The wheel assembly of claim 7, wherein said centerpiece is inertially neutral with respect to said spindle axis.

11. The wheel assembly of claim 7, wherein said spindle axis is aligned with said axis of rotation.

12. A wheel assembly in combination with a motor vehicle, the wheel assembly having a front side and a rear side, the wheel assembly comprising:
   a rim interconnected to the motor vehicle for rotation about an axis of rotation;
   a centerpiece carried by said rim; and
   means for indexing said centerpiece to a predetermined orientation during rotation of said rim including:
      a spindle rotatably attached to said rim, said centerpiece attached to said spindle, said spindle defining a spindle axis;
      a first plurality of magnets attached to said centerpiece; and
      a second plurality of magnets fixedly positioned behind said rim.

13. The wheel assembly in combination with the motor vehicle of claim 12, wherein said first plurality of magnets includes first and second magnets disposed in diametrically opposite positions with respect to said spindle axis so as to create a first magnetic field.

14. The wheel assembly in combination with the motor vehicle of claim 12, wherein said second plurality of magnets includes first and second magnet stacks disposed in diametrically opposite positions with respect to said spindle axis so as to create a second magnetic field such that said second magnetic field cooperates with said first magnetic field to thereby index said centerpiece to a predetermined orientation during rotation of said rim.

15. The wheel assembly in combination with the motor vehicle of claim 12, wherein said centerpiece is inertially neutral with respect to said spindle axis.

16. The wheel assembly in combination with the motor vehicle of claim 12, wherein said spindle axis is aligned with said axis of rotation.

17. A wheel assembly for a motor vehicle, the wheel assembly comprising:
   a rim adapted to be interconnected to the motor vehicle for rotation about an axis of rotation;
   a centerpiece;
   a spindle rotatably attached to said rim, said centerpiece attached to said spindle, said spindle defining a spindle axis; and
   a plurality of magnets attached to at least one of said centerpiece and said rim, said plurality of magnets operative for indexing said centerpiece to a predetermined orientation during rotation of said rim;
   wherein said plurality of magnets includes a first plurality of magnets attached to said centerpiece and a second plurality of magnets fixedly positioned behind said rim.

18. The wheel assembly of claim 17, wherein said first plurality of magnets includes first and second magnets disposed in diametrically opposite positions with respect to said spindle axis so as to create a first magnetic field.

19. The wheel assembly of claim 17, wherein said second plurality of magnets includes first and second magnet stacks disposed in diametrically opposite positions with respect to said spindle axis so as to create a second magnetic field such that said second magnetic field cooperates with said first magnetic field to thereby index said centerpiece to a predetermined orientation during rotation of said rim.

20. The wheel assembly of claim 17, wherein said centerpiece is inertially neutral with respect to said spindle axis.

21. The wheel assembly of claim 17, wherein said spindle axis is aligned with said axis of rotation.

* * * * *